United States Patent
Yamamoto

(10) Patent No.: US 9,665,216 B2
(45) Date of Patent: May 30, 2017

(54) DISPLAY CONTROL DEVICE, DISPLAY CONTROL METHOD AND PROGRAM

(71) Applicant: PANASONIC CORPORATION, Osaka (JP)

(72) Inventor: Masayuki Yamamoto, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 64 days.

(21) Appl. No.: 14/235,832

(22) PCT Filed: May 16, 2013

(86) PCT No.: PCT/JP2013/003132
§ 371 (c)(1),
(2) Date: Jan. 29, 2014

(87) PCT Pub. No.: WO2014/024363
PCT Pub. Date: Feb. 13, 2014

(65) Prior Publication Data
US 2014/0192022 A1 Jul. 10, 2014

(30) Foreign Application Priority Data
Aug. 9, 2012 (JP) ................. 2012-177368

(51) Int. Cl.
*G06F 3/044* (2006.01)
*G06F 3/0488* (2013.01)

(52) U.S. Cl.
CPC ............ *G06F 3/044* (2013.01); *G06F 3/0488* (2013.01); *G06F 2203/04805* (2013.01)

(58) Field of Classification Search
CPC .................. G06F 3/0488; G06F 3/044; G06F 2203/04805
(Continued)

(56) References Cited

U.S. PATENT DOCUMENTS

2002/0011990 A1* 1/2002 Anwar .......................... 345/173
2003/0179219 A1* 9/2003 Nakano ................. G06F 3/0481
345/660
(Continued)

FOREIGN PATENT DOCUMENTS

JP 2-153415 6/1990
JP 6-274586 9/1994
(Continued)

OTHER PUBLICATIONS

International Search Report and Written Opinion from PCT/JP2013/003132, mail date is Aug. 6, 2013.
(Continued)

*Primary Examiner* — Kumar Patel
*Assistant Examiner* — Sejoon Ahn
(74) *Attorney, Agent, or Firm* — Greenblum & Bernstein, P.L.C.

(57) ABSTRACT

A proximity detection unit detects the proximity of a finger to a screen and outputs a proximity detection signal. A contact detection unit detects the contact of the finger to the screen and outputs a contact detection signal. On the basis of the proximity detection signal, a display control unit magnifies and displays a predetermined range around a proximity corresponding position. On the basis of the contact detection signal depending on the contact operation of the indicator for the predetermined range, the display control unit fixes the magnified display of the predetermined range and does not change the display position of the magnified predetermined range depending on the movement operation of the finger on the screen.

9 Claims, 8 Drawing Sheets

(58) Field of Classification Search
USPC .......................................................... 345/661
See application file for complete search history.

(56) References Cited

U.S. PATENT DOCUMENTS

| | | | |
|---|---|---|---|
| 2004/0021643 A1* | 2/2004 | Hoshino | G06F 3/016 345/173 |
| 2004/0243747 A1 | 12/2004 | Rekimoto | |
| 2005/0212979 A1* | 9/2005 | Morita | A63F 13/06 348/734 |
| 2006/0022955 A1* | 2/2006 | Kennedy | 345/173 |
| 2006/0072828 A1* | 4/2006 | Silverbrook | G06F 3/0321 382/203 |
| 2006/0161846 A1 | 7/2006 | Van Leeuwen | |
| 2008/0244456 A1* | 10/2008 | Shimizu | G06F 3/0481 715/840 |
| 2009/0122007 A1 | 5/2009 | Tsuzaki et al. | |
| 2009/0237371 A1* | 9/2009 | Kim et al. | 345/173 |
| 2009/0315848 A1 | 12/2009 | Ku et al. | |
| 2009/0327977 A1 | 12/2009 | Bachfischer et al. | |
| 2010/0002016 A1* | 1/2010 | Kim | 345/660 |
| 2010/0026723 A1 | 2/2010 | Nishihara et al. | |
| 2010/0033505 A1* | 2/2010 | Hsieh | 345/660 |
| 2010/0056220 A1* | 3/2010 | Oh et al. | 455/566 |
| 2010/0066695 A1 | 3/2010 | Miyazaki | |
| 2010/0085384 A1* | 4/2010 | Kim et al. | 345/660 |
| 2011/0105193 A1* | 5/2011 | Lee | G06F 3/0488 455/566 |
| 2011/0128164 A1 | 6/2011 | Kang et al. | |
| 2011/0157078 A1* | 6/2011 | Miyazawa et al. | 345/174 |
| 2011/0234639 A1* | 9/2011 | Shimotani et al. | 345/661 |
| 2012/0084692 A1* | 4/2012 | Bae | G06F 3/04817 715/769 |
| 2012/0154331 A1 | 6/2012 | Hasui | |
| 2013/0147702 A1 | 6/2013 | Aaltonen et al. | |
| 2013/0239059 A1* | 9/2013 | Chen | G06F 3/0488 715/835 |
| 2014/0082559 A1 | 3/2014 | Suggs | |
| 2014/0293165 A1 | 10/2014 | Rekimoto | |
| 2014/0300579 A1 | 10/2014 | Rekimoto | |

FOREIGN PATENT DOCUMENTS

| | | |
|---|---|---|
| JP | 2002-342033 | 11/2002 |
| JP | 2005-267049 | 9/2005 |
| JP | 2006-31499 | 2/2006 |
| JP | 2006-59238 | 3/2006 |
| JP | 2006-520024 | 8/2006 |
| JP | 2006-236143 | 9/2006 |
| JP | 2007-072233 | 3/2007 |
| JP | 2008-226282 | 9/2008 |
| JP | 2008-287323 | 11/2008 |
| JP | 2009-116769 | 5/2009 |
| JP | 2009-530726 | 8/2009 |
| JP | 2010-039278 | 2/2010 |
| JP | 2010-67135 | 3/2010 |
| JP | 2011-118857 | 6/2011 |
| JP | 2011-134271 | 7/2011 |
| JP | 2011-154524 | 8/2011 |
| WO | 2009/069392 | 6/2009 |
| WO | 2010/064423 | 6/2010 |
| WO | 2011/027665 | 3/2011 |

OTHER PUBLICATIONS

U.S. Appl. No. 14/236,097 to Masatoshi Nakao, filed Jan. 30, 2014.
U.S. Appl. No. 14/235,143 to Tatsuro Igarashi et al., filed Jan. 27, 2014.
U.S. Appl. No. 14/164,471 to Hiroyuki Sato et al., filed Jan. 27, 2014.
U.S. Appl. No. 14/234,470 to Masatoshi Nakao, filed Jan. 23, 2014.
U.S. Appl. No. 14/156,803 to Noriyuki Kawahara et al., filed Jan. 16, 2014.
International Search Report and Written Opinion (ISR/WO) from PCT/JP2013/001798, mail date is Apr. 9, 2013, together with an English language translation of ISR.

* cited by examiner

DISPLAY CONTROL DEVICE, DISPLAY CONTROL METHOD AND PROGRAM

TECHNICAL FIELD

The present invention relates to a display control device, a display control method and a program for supporting input operation performed via a touch panel.

BACKGROUND ART

A touch panel capable of providing an intuitive user interface (UI) for the user is widely used as a device for accepting input operation to an electronic apparatus including a portable phone or a smart phone, for example. The touch panel accepts input operation to the screen of a display unit (for example, an LCD (liquid crystal display) or an organic EL (electroluminescence) display) provided for such an electronic apparatus, and the results of the processing for the input operation are displayed on the screen.

In addition, recently, a touch panel capable of detecting the proximity of a finger is known (for example, refer to Patent Document 1). The non-contact-type user input device of Patent Document 1 includes a plurality of linear transmission electrodes, a transmitter for supplying an AC current for transmission to the respective transmission electrodes, a plurality of linear reception electrodes disposed so as not to make contact with the respective transmission electrodes, and a receiver for receiving the AC current flowing through the reception electrodes. A capacitor is formed at each intersection of the transmission electrode and the reception electrode. Furthermore, since a capacitor is formed in response to the proximity of the fingertip of the user, the electrostatic capacitance value of the capacitor changes depending on the degree of the proximity of the fingertip. The non-contact-type user input device can recognize the distance between the touch panel and the finger on the basis of the change in the electrostatic capacitance value.

The touch panel of Patent Document 1 can detect a state in which the finger is held over at a position in the space at a predetermined height or less from the horizontal plane of the touch panel, that is, the proximity state of the finger with respect to the touch panel, whereby on the basis of the electrostatic capacitance value determined by the distance between the finger and the touch panel, the touch panel can detect that the finger in the space was slid in nearly parallel with the touch panel as in the case that the finger directly touched the touch panel and was slid on the touch panel. Hence, it is expected that such a touch panel capable of detecting the proximity of the finger will be accepted comprehensively as a new user interface.

Moreover, a keyboard device is known in which a touch panel detects the position of a finger making contact with a screen on which the content (key tops) of the keyboard is displayed and a finger sensor unit detects the position of the finger proximate to the screen (for example, refer to Patent Document 2). In the keyboard device of Patent Document 2, only the key frames of the keys proximate to the position of the finger detected by the finger sensor unit are magnified and displayed and the key frames of the keys away from the position of the finger are reduced and displayed. The finger sensor unit of Patent Document 2 is configured using an optical sensor or an infrared sensor.

PRIOR ART DOCUMENT

Patent Document

Patent Document 1: JP-A-2002-342033
Patent Document 2: JP-A-2-153415

SUMMARY OF THE INVENTION

Problem to be Solved by the Invention

However, in Patent Document 2, the proximity state of the finger to the screen is not detected using the touch panel disclosed in Patent Document 1. Furthermore, in Patent Document 2, with respect to the magnified area, since the finger is located at a position close to the screen, the finger interrupts part of a magnified content. Hence, even if the content close to the finger, the proximity state of which was detected, was magnified and displayed, there occurs a problem that the visibility of the entire magnified content is not improved.

The present invention was devised in consideration of the above-mentioned circumstances, and an object of the present invention is to provide a display control device, a display control method and a program for improving the visibility of magnified contents by magnifying and displaying a predetermined range around a position on a screen corresponding to the position of an indicator, the proximity of which was detected, and by fixedly continuing the magnified display of the predetermined range on the basis of the contact of the indicator to the screen, regardless of the presence or absence of the movement operation of the indicator on the screen.

Means for Solving the Problems

The present invention provides a display control device comprising: a display unit which displays data on a screen; a proximity detection unit which detects proximity of an indicator to the screen and outputs a proximity detection signal; a contact detection unit which detects the contact of the indicator to the screen and outputs a contact detection signal; and a display control unit which magnifies and displays, on the basis of the proximity detection signal, a predetermined range around a proximity corresponding position or a position away from the proximity corresponding position by an approximately predetermined distance from among the data displayed on the screen, the proximity corresponding position being a position on the screen corresponding to the position of the indicator whose proximity to the screen was detected, wherein the display control unit fixes the magnified display of the predetermined range on the basis of the contact detection signal depending on the contact operation of the indicator for the predetermined range and does not change the display position of the magnified predetermined range depending on a movement operation of the indicator on the screen.

With this configuration, since the predetermined range around the position (proximity corresponding position) on the screen corresponding to the position of the indicator (for example, a finger), the proximity of which was detected, is magnified and displayed and the magnified display of the predetermined range is continued fixedly on the basis of the contact of the indicator to the screen, regardless of the presence or absence of the movement operation of the indicator on the screen, the visibility of magnified contents can be improved.

Furthermore, the present invention is a display control method of a display control device equipped with a display unit for displaying data on a screen, comprising the steps of: detecting proximity of an indicator to the screen and outputting a proximity detection signal; magnifying and displaying, on the basis of the proximity detection signal, a predetermined range around a proximity corresponding position or a position away from the proximity corresponding position by an approximately predetermined distance from among the data displayed on the screen, wherein the proximity corresponding position is a position on the screen corresponding to the position of the indicator whose proximity was detected; detecting the contact of the indicator to the screen and outputting a contact detection signal; fixing the magnified display of the predetermined range on the basis of the contact detection signal depending on the contact operation of the indicator to the predetermined range; and unchanging the display position of the magnified predetermined range depending on the movement operation of the indicator on the screen.

With this method, since the predetermined range around the position (proximity corresponding position) on the screen corresponding to the position of the indicator (for example, a finger), the proximity of which was detected, is magnified and displayed and the magnified display of the predetermined range is continued fixedly on the basis of the contact of the indicator to the screen, regardless of the presence or absence of the movement operation of the indicator on the screen, the visibility of magnified contents can be improved.

Moreover, the present invention is a program for executing a method for a computer serving as a display control device equipped with a display unit for displaying data on a screen, comprising the steps of: detecting proximity of an indicator to the screen and outputting a proximity detection signal; magnifying and displaying, on the basis of the proximity detection signal, a predetermined range around a proximity corresponding position or a position away from the proximity corresponding position by an approximately predetermined distance from among the data displayed on the screen, wherein the proximity corresponding position is a position on the screen corresponding to the position of the indicator whose proximity was detected; detecting the contact of the indicator to the screen and outputting a contact detection signal; fixing the magnified display of the predetermined range on the basis of the contact detection signal depending on the contact operation of the indicator to the predetermined range; and unchanging the display position of the magnified predetermined range depending on the movement operation of the indicator on the screen.

With this program, since the predetermined range around the position (proximity corresponding position) on the screen corresponding to the position of the indicator (for example, a finger), the proximity of which was detected, is magnified and displayed and the magnified display of the predetermined range is continued fixedly on the basis of the contact of the indicator to the screen, regardless of the presence or absence of the movement operation of the indicator on the screen, the visibility of magnified contents can be improved.

Advantage of the Invention

With the present invention, since the predetermined range around the position (proximity corresponding position) on the screen corresponding to the position of the indicator (for example, a finger), the proximity of which was detected, is magnified and displayed and the magnified display of the predetermined range is continued fixedly on the basis of the contact of the indicator to the screen, regardless of the presence or absence of the movement operation of the indicator on the screen, the visibility of magnified and displayed contents can be improved.

MODE FOR CARRYING OUT THE INVENTION

Figure 1:
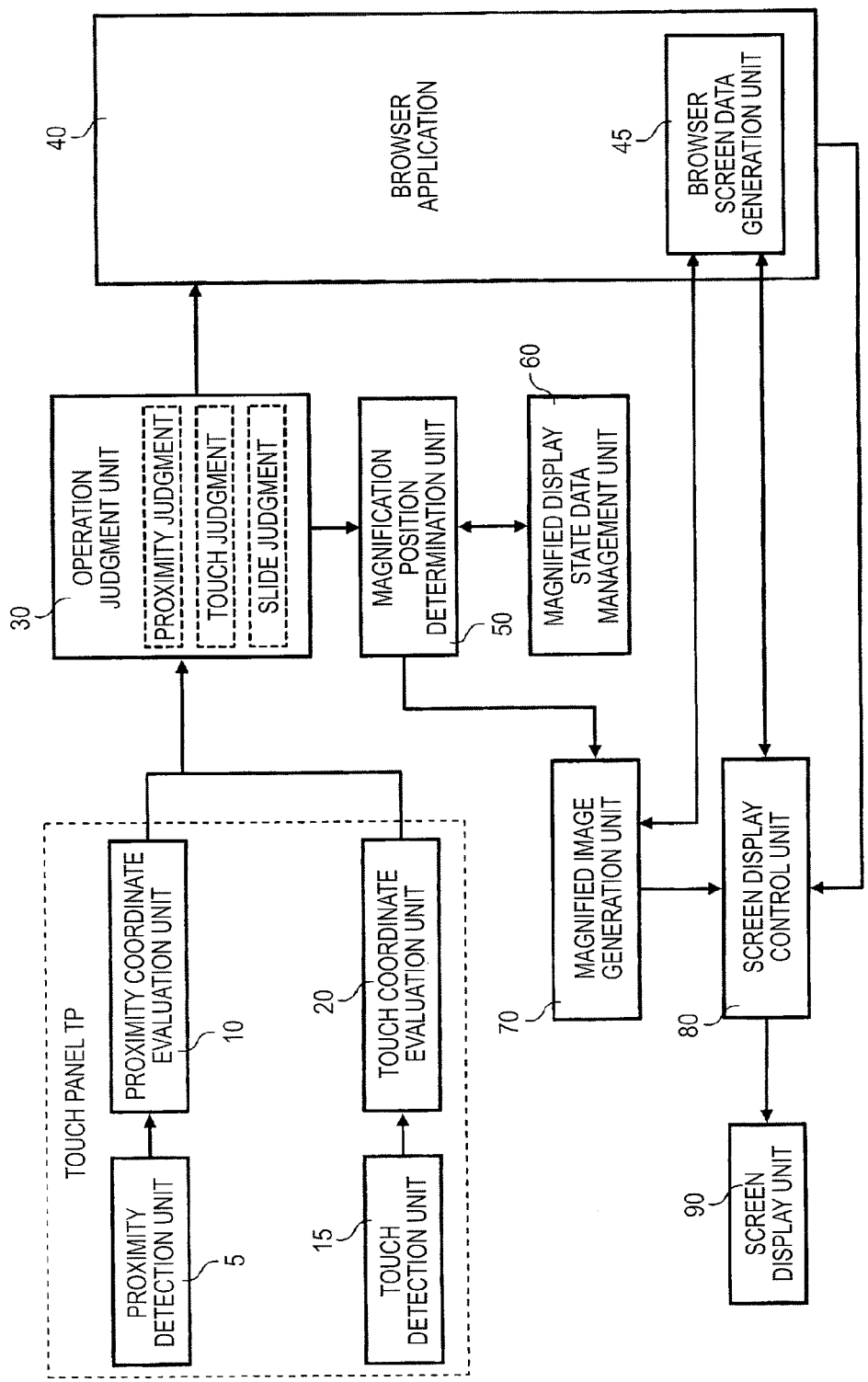
FIG. 1 is a block diagram showing the functional configuration of a portable terminal 1 according to this embodiment.

A display control device, a display control method and a program according to the present invention will be described below referring to the drawings. The display control device according to the present invention is an electronic apparatus including a display unit for displaying data on a screen, such as a portable phone, a smart phone, a tablet terminal, a digital still camera, a PDA (personal digital assistant) or an electronic book terminal. The following explanation will be given by using a portable terminal (for example, a smart phone) as an example of the display control device for explaining each embodiment.

The present invention can be represented as a display control device used as an apparatus or as a program for executing various actions (steps) that are performed by a display control device serving as a computer. Furthermore, the present invention can also be represented as a display control method including various actions (steps) that are performed by a display control device. In other words, the present invention can be represented as a category out of an apparatus, a method and a program.

(Explanation of Terms Required for Understanding this Embodiment)

Although the following explanation is given by using a finger (for example, an index finger) of the user as an example of an indicator that approaches or makes contact with a touch panel, the indicator is not limited to a finger of the user, but may be a conductive stylus (touch pen). Moreover, the indicator approaching or making contact with the touch panel is not limited particularly, provided that the approach and touch (contact) of the indicator to the touch panel can be detected.

Furthermore, it is assumed that the two axes representing the horizontal plane of the touch panel are an x-axis and a y-axis and that the axis representing the vertical direction (height direction) with respect to the horizontal plane of the touch panel is a z-axis. Besides, in the following explanation, "touch coordinates" represent coordinates (x, y) for specifying the position of the finger on the horizontal plane of the touch panel at the time when the touch panel detected the touch (contact) of the finger, and "proximity coordinates" represent coordinates (x, y, z) for specifying the position of the finger in a proximity detectable area in the space at the time when the touch panel detected the proximity of the finger. The z coordinate value of the proximity coordinates represents the height of the finger located in the space away from the horizontal plane of the touch panel. Furthermore, in the following explanation, the position (the position on the horizontal plane of the touch panel) on the screen corresponding to the position of the finger located in the space in which the proximity of the finger was detected is defined as a "proximity corresponding position."

Moreover, the operation of holding the finger at a position inside the proximity detectable area in the space away from the horizontal plane of the touch panel in the direction of being separated therefrom is defined as a "hover operation" and the operation of sliding (moving) the finger from the position in the space in which the finger was held by the hover operation in nearly parallel with the horizontal plane of the touch panel is defined as a "hover-slide operation." Hence, the operation of bringing the finger into direct touch with a specific position on the horizontal plane of the touch panel is not a "hover operation" but a "touch operation." What's more, the operation of bringing the finger into touch (contact) with the horizontal plane of the touch panel and then sliding (moving) the finger along the horizontal plane is defined as a "touch-slide operation."

In order that a hover operation or a hover-slide operation is detected, since the distance between the finger and the plane of the touch panel is inversely proportional to the value of the electrostatic capacitance detected by the touch panel, it is preferable that the distance corresponds to the range of the electrostatic capacitance values detectable by the touch panel.

Explanation of this Embodiment

In a portable terminal 1 according to this embodiment, a predetermined range around the position (proximity corresponding position) on a screen DP corresponding to the position of a finger FG, the proximity of which was detected, or a position away from the proximity corresponding position by an approximately predetermined distance s2 is magnified and displayed (refer to FIG. 2(B) or FIG. 3(A)). In the following explanation, the display area of the magnified predetermined range is referred to as a "magnified display area." Furthermore, in the portable terminal 1, on the basis of the contact of the finger FG to the magnified display area, the magnified display of the predetermined range having already been magnified and displayed is continued fixedly, regardless of the presence or absence of the movement operation (touch-slide operation) of the finger FG on the screen DP (refer to FIGS. 3(A) to 3(C)).

Moreover, in the portable terminal 1, when the finger FG was moved away from the screen DP (by a release operation) and then performed a hover operation again during the continuation of the magnified display of the predetermined range, the magnified display area is displayed so as to be moved continuously from the center position of the magnified display area to the proximity corresponding position corresponding to the position the finger FG performing the hover operation (refer to FIGS. 4(A) to 4(C)).

(Functional Configuration of the Portable Terminal 1 According to this Embodiment)

First, the functional configuration of the portable terminal 1 according to this embodiment will be described referring to FIG. 1. FIG. 1 is a block diagram showing the functional configuration of the portable terminal 1 according to this embodiment. The portable terminal 1 shown in FIG. 1 includes a proximity detection unit 5, a proximity coordinate evaluation unit 10, a touch detection unit 15, a touch coordinate evaluation unit 20, an operation judgment unit 30, a browser application 40, a magnification position determination unit 50, a magnified display state data management unit 60, a magnified image generation unit 70, a screen display control unit 80 and a screen display unit 90. The browser application 40 has a browser screen data generation unit 45.

Each of the operation judgment unit 30, the browser application 40, the browser screen data generation unit 45, the magnification position determination unit 50, the magnified image generation unit 70 and the screen display control unit 80 can operate when a processor (not shown) built in the portable terminal 1 reads and executes a program in which the operation of each unit has been specified in advance. The processor is, for example, a CPU (central processing unit), an MPU (micro-processing unit) or a DSP (digital signal processor).

The proximity detection unit 5 detects that the finger FG (refer to FIG. 2(B)) of the user approached a touch panel TP through a hover operation or a hover-slide operation. The proximity detection unit 5 outputs a proximity notice stating that the finger FG approached the touch panel TP to the proximity coordinate evaluation unit 10.

On the basis of the proximity notice output from the proximity detection unit 5, the proximity coordinate evaluation unit 10 calculates the proximity coordinates (x, y, z) of the finger FG with respect to the touch panel TP as a proximity detection signal at the time of proximity detection. Although the proximity detection signal is explained as proximity coordinates in the following explanation, the signal may be the value of the electrostatic capacitance calculated at the time of the proximity detection. As described above, the x-coordinate value and the y-coordinate value of the proximity coordinates (x, y, z) are coordinate values representing a position on the horizontal plane of the touch panel TP, that is, coordinate values indicating the proximity corresponding position, and the z-coordinate value is a coordinate value representing the distance (height) between the finger FG and the touch panel TP in the z-axis direction. Depending on the performance of the proximity detection unit 5, the z-coordinate value does not represent the distance but may have only two states, that is, a state in which the proximity state was detected and a state in which the proximity state wan not detected, in some cases; in such a case, additional information stating that the proximity state was detected and the (x, y) coordinates may be set, or a value (for example, z=1) indicating that the proximity state was detected may be set in z. The proximity coordinate evaluation unit 10 outputs the information of the calculated proximity coordinates (x, y, z) to the operation judgment unit 30. The proximity detection unit 5 and the proximity coordinate evaluation unit 10 may be combined so as to be configured as a proximity detection unit.

The touch detection unit 15 serving as a contact detection unit detects that the finger FG touched (made contact with) the touch panel TP by a touch operation or a touch-slide operation. The touch detection unit 15 outputs a contact notice stating that the finger FG touched (made contact with) the touch panel TP to the touch coordinate evaluation unit 20.

On the basis of the contact notice output from the touch detection unit 15, the touch coordinate evaluation unit 20 calculates the touch coordinates (x, y) at the time when the finger FG made contact with the touch panel TP as a contact detection signal at the time of the contact detection. Although the contact detection signal is explained as the touch coordinates in the following explanation, the signal may be the value of electrostatic capacitance calculated at the time of the contact detection. The touch coordinate evaluation unit 20 outputs the information of the calculated touch coordinates (x, y) to the operation judgment unit 30. The touch detection unit 15 and the touch coordinate evaluation unit 20 may be combined so as to be configured as a contact detection unit.

In this embodiment, the touch panel TP capable of detecting both the touch (contact) and proximity of the finger FG can be configured using the proximity detection unit 5, the proximity coordinate evaluation unit 10, the touch detection unit 15 and the touch coordinate evaluation unit 20.

On the basis of the information of the proximity coordinates (x, y, z) output from the proximity coordinate evaluation unit 10 or the information of the touch coordinates (x, y) output from the touch coordinate evaluation unit 20, the operation judgment unit 30 judges whether the input operation of the finger FG is a hover operation, a hover-slide operation, a touch operation or a touch-slide operation.

In the case that the content of image data of the browser application 40 generated by the browser screen data generation unit 45 is displayed (refer to FIG. 2(A)), when the operation judgment unit 30 judges that the input operation of the finger FG is a hover operation or a hover-slide operation (refer to FIG. 3(A)), the operation judgment unit 30 outputs the information of the proximity corresponding position on the screen DP corresponding to the position of the finger FG, the proximity of which has been detected, to the magnification position determination unit 50.

In the case that the predetermined range AR1 of the content of the image data of the browser application 40 is magnified and displayed (refer to FIG. 3(A)), when the operation judgment unit 30 judges that the input operation of the finger FG is a touch operation (refer to FIG. 3(B)), the operation judgment unit 30 outputs the information of the touch coordinates to the magnification position determination unit 50.

Furthermore, in the case that the operation judgment unit 30 has not judged that the input operation of the finger FG that was performed after a position (for example, center position P1) inside the display area of the magnified predetermined range AR1 was touched by the finger FG is a touch-slide operation serving as an operation instruction for fixing the display position (for example, in the case that the input operation has been judged as tap or double-tap, for example), the information of the touch coordinates (x, y) output from the touch coordinate evaluation unit 20 may be output to the browser application 40.

Moreover, even in the case that the operation judgment unit 30 has judged that the input operation is the same touch-slide operation, in the case that the operation judgment unit 30 outputs the coordinates (x, y) of the touch-slide operation to the browser application 40 in advance and the browser application 40 did not perform the process corresponding to the touch-slide operation of the coordinates (x, y) output from the operation judgment unit 30, the operation judgment unit 30 may judge again that the input operation is the touch-slide operation serving as an operation instruction for fixing the display position.

The case in which the browser application 40 did not perform the process corresponding to the touch-slide operation of the coordinates (x, y) output from the operation judgment unit 30 corresponds to, for example, a case in which a button or the like (for example, a hyperlink) to be used for the input operation of the user is not present in the coordinates (x, y) output from the operation judgment unit 30 at the execution time of the browser application 40, for example. The judgment as to whether the browser application 40 performed the process can be made depending on whether, for example, the return value of the subroutine (function) for executing the corresponding process was notified in the program code of the browser application 40.

The browser application 40 is an example of an application program that can be obtained by various measures, such as a measure in which the application program is stored beforehand in the ROM (read-only memory) built in the portable terminal 1, a measure in which the application program is downloaded from a network, or a measure in which the application program is directly copied and installed in the portable terminal by the user, and the browser application 40 accepts the user's input operation to the browser application 40 and executes the process for the display content displayed at the position corresponding to the touch coordinates (x, y) output from the operation judgment unit 30 depending on the input operation.

For example, in the case that information stating that a tap operation was performed for a certain hyperlink in the web site displayed on the screen DP was obtained from the operation judgment unit 30, the browser application 40 executes the process corresponding to the hyperlink, generates screen data serving as the result of the execution of the process at the browser screen data generation unit 45 and outputs the screen data to the screen display control unit 80.

In the case that the position (for example, the center position P1) of the magnified predetermined range AR1 was touched by the touch operation of the finger FG, the magnification position determination unit 50 judges that the magnified display of the display content of the browser application 40 enclosed in the predetermined range AR1 is continued fixedly, regardless of the presence or absence of the touch-slide operation of the finger FG.

Furthermore, after the position (for example, the center position P1) of the magnified predetermined range AR1 was touched by the touch operation of the finger FG, the magnification position determination unit 50 temporarily stores, in the magnified display state data management unit 60, the information of the touch coordinates (x, y) output from the operation judgment unit 30 at the time of the switching from the hover operation to the touch operation of the finger FG in the case that the continuous movement of the magnified display area at the time of the switching from the touch-slide operation to the hover operation is performed again. Moreover, the magnified image generation unit 70 outputs, to the screen display control unit 80, a magnified image in which the display position of the magnified display area has been fixed, regardless of the information of the touch coordinates (x, y) output from the operation judgment unit 30 during the touch-slide operation of the finger FG.

Hence, the screen display control unit 80 temporarily fixes the magnified display of the predetermined range AR1, and after the magnified display of the predetermined range AR1 has been temporarily fixed and until the fixing of the magnified display of the predetermined range AR1 is released, the screen display control unit 80 continues the magnified display of the predetermined range AR1 around the touch coordinates (x, y) touched by the touch operation of the finger FG, regardless of the presence or absence of the touch-slide operation of the finger FG. As a result, in the portable terminal 1, even if the finger FG is moved, for example, from the inside of the predetermined range AR1 to the outside of the predetermined range AR1 (refer to FIG. 3(C)), the visibility of the content of the magnified predetermined range AR1 is not degraded, whereby the visibility of the content of the magnified predetermined range AR1 can be improved.

The browser screen data generation unit 45 generates screen data that can be displayed on the screen display unit 90 using the data of a web site received from an external web server apparatus (not shown) via the Internet by the portable terminal 1, for example, depending on the user's input operation to the browser application 40. The browser screen data generation unit 45 outputs the generated screen data to the screen display control unit 80.

Figure 5:
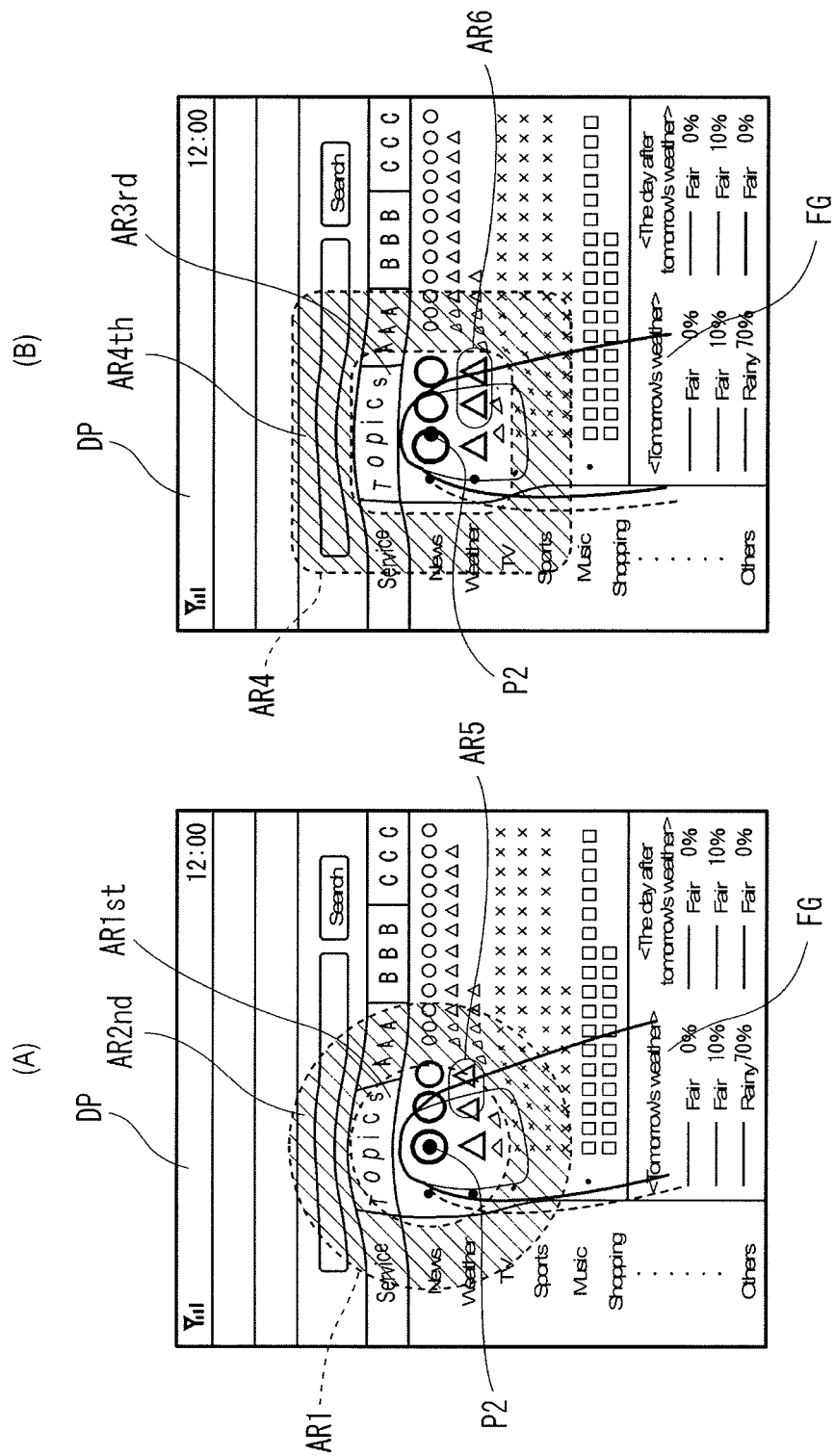
FIG. 5(A) is a view showing an example of the magnified display area having a circular shape.
FIG. 5(B) is a view showing an example of the magnified display area having a quadrangular shape.

On the basis of the position information output from the operation judgment unit 30, the magnification position determination unit 50 determines the size and the center position of the magnified display area. The size of the magnified display area, including its shape, may be specified beforehand in the operation of the magnification position determination unit 50 or may be changed appropriately depending on the input operation of the user. In the case that the magnified display area includes the first display area AR1st (AR3rd) and the second display area AR2nd (AR4th) shown in FIG. 5, the size of the magnified display area includes the size of the range of the first display area AR1st (AR3rd) and the size of the range of the second display area AR2nd (AR4th). The magnification position determination unit 50 outputs the information of the determined size and center position to the magnified display state data management unit 60 and the magnified image generation unit 70.

In the case that the information of the proximity corresponding position on the screen DP corresponding to the position of the finger FG, the proximity of which was detected or has been detected, was obtained from the operation judgment unit 30 (refer to FIG. 3(A)), the magnification position determination unit 50 determines the center position of the magnified display area as the proximity corresponding position on the screen DP corresponding to the position of the finger FG. Moreover, the magnification position determination unit 50 may determine the center position of the magnified display area as a position away from the proximity corresponding position on the screen DP corresponding to the position of the finger FG by the predetermined distance s2 (refer to FIG. 2(B)).

In the case that the touch coordinates were obtained from the operation judgment unit 30 (refer to FIG. 3(B)), the magnification position determination unit 50 determines the center position of the magnified display area at the time of the temporal fixing of the magnified display of the predetermined range AR1 as the position of the touch coordinates output from the operation judgment unit 30.

The magnified display state data management unit 60 is configured using, for example, a RAM (random access memory) and temporarily stores the information of the position determined by the magnification position determination unit 50. Furthermore, when the display on the portable terminal 1 is performed so that the magnified display area is moved from the center position of the magnified display area to the proximity corresponding position corresponding to the position of the finger FG, the operation of which has been changed from the touch operation to the hover operation, the magnified display state data management unit 60 stores magnified display state data indicating the display state of the latest magnified display area. The magnified display state data includes at least one of the position, speed and acceleration of the magnified display area (described later).

The magnified image generation unit 70 obtains the screen data of the browser application 40 generated by the browser screen data generation unit 45, generates the image data of the magnified display area around the position output from the magnification position determination unit 50 on the basis of the information of the size and the center position output from the magnification position determination unit 50, and outputs the image data to the screen display control unit 80.

The magnified display area generated by the magnified image generation unit 70 may include the first display area AR1st (AR3rd) and the second display area AR2nd (AR4th) serving as the same display area or different display areas. In the range of the first display area AR1st (AR3rd) including the center position of the magnified display area, magnified display is performed at a magnification ratio larger than a predetermined value (for example, 2), and in the range of the second display area AR2nd (AR4th) excluding the first display area AR1st (AR3rd), magnified display is performed at a magnification ratio smaller than the predetermined value (for example, 2).

However, in the range of the second display area AR2nd (AR4th), a position in which the rate of change of the magnification ratio changes suddenly and a position in which the magnification ratio is 1 or less may present in some cases to maintain the continuity (connections among display images) between the display content and the surrounding range. Magnification at a magnification ratio of 1 corresponds to equal magnification display, and magnification at a magnification ratio of less than 1 corresponds to reduced magnification display; however, even in such cases (equal magnification display, enlarged magnification display and reduced magnification display), a different reading can be adopted easily; hence, an additional explanation stating that equal magnification display or reduced magnification display is obtained in the case of the magnification at a magnification ratio of 1 or less is omitted in the following explanation.

In other words, in the portable terminal 1 according to this embodiment, in the range of the first display area AR1st (AR3rd), magnified display is performed at a magnification ratio larger than the predetermined value (for example, 2), and in the range of the second display area AR2nd (AR4th), magnified display is performed at a magnification ratio relatively smaller than that in the range of the first display area AR1st (AR3rd) to improve the visibility of the content displayed in the magnified display area (refer to FIG. 5(A) or 5(B)).

What's more, in the case that the continuity (connections among display images) between the display content and the surrounding range is maintained, the magnified image generation unit 70 may decrease image distortion in the range of the first display area AR1st (AR3rd) by gently changing the rate of change of the magnification ratio. In this case, the rate of change of the magnification ratio is changed suddenly in the range of the second display area AR2nd (AR4th), and image distortion occurs, whereby the visibility in the range of the second display area AR2nd (AR4th) may be degraded in some cases.

The screen display control unit 80 serving as a display control unit displays the screen data of the browser application 40 output from the browser screen data generation unit 45 on the screen display unit 90. In addition, the screen display control unit 80 synthesizes the screen data of the browser application 40 output from the browser screen data generation unit 45 and the image data of the magnified display area output from the magnified image generation unit 70 and displays the synthesized screen data on the screen display unit 90.

The screen display unit 90 is configured using an LCD or an organic EL display, for example, and displays the screen data of the browser application 40 or the screen data obtained by synthesizing the screen data of the browser application 40 and the image data of the magnified display area on the screen DP.

(Operation Outline of the Portable Terminal 1 According to this Embodiment)

Figure 2:
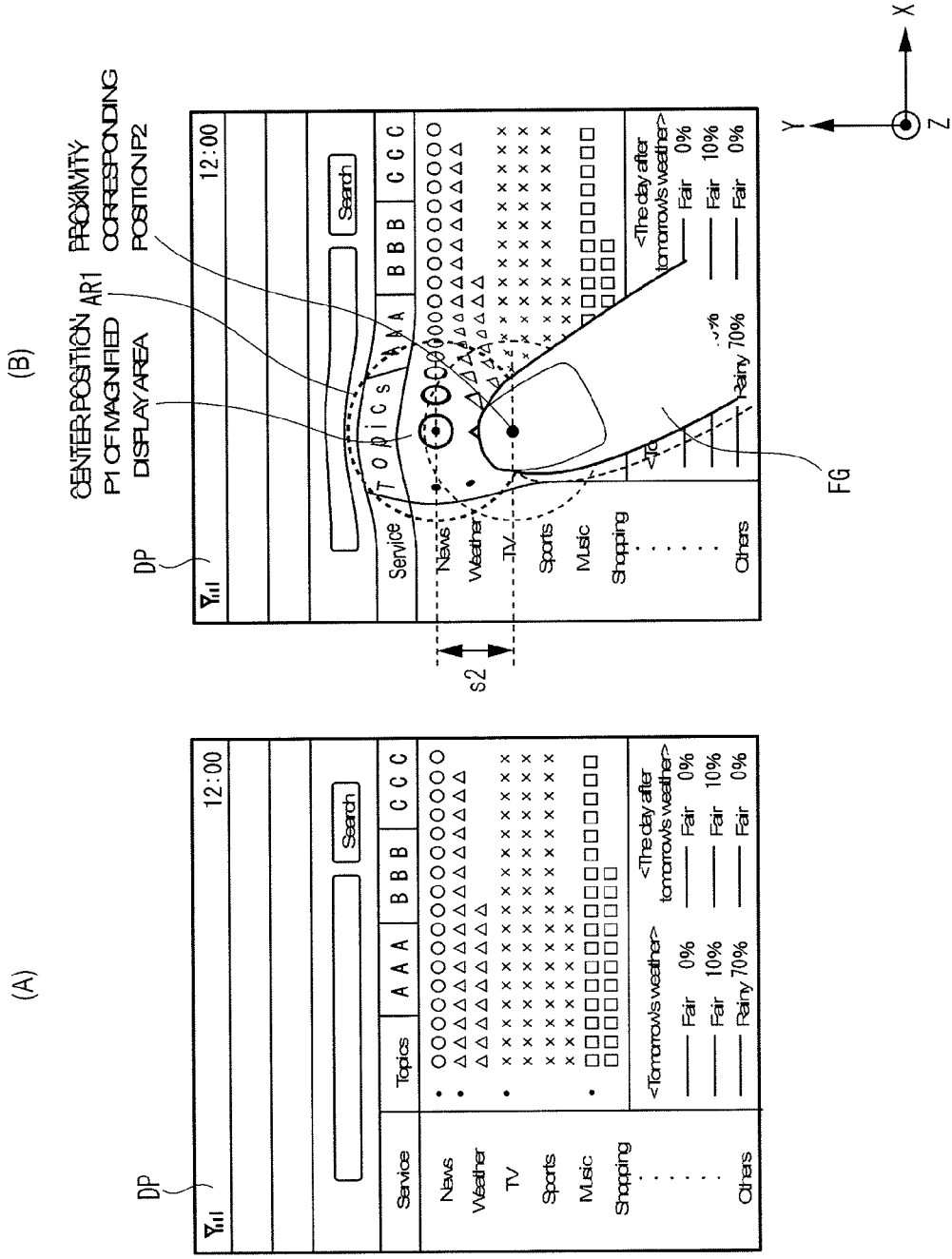
FIG. 2(A) is a view showing an example of a display content to be displayed on a screen DP at the time when a browser application 40 is used.
FIG. 2(B) is a view showing a state in which the display area of a predetermined range AR1 around a position (the center position P1 of a magnified display area) away from a proximity corresponding position P2 by a predetermined distance s2 is magnified and displayed.

Next, the operation outline 1 to the operation outline 4 of the portable terminal 1 according to this embodiment will be described referring to FIGS. 2 to 5, respectively. FIG. 2(A) is a view showing an example of a display content to be displayed on the screen DP at the time when the browser application 40 is used. FIG. 2(B) is a view showing a state in which the display area of the predetermined range AR1 around a position (the center position P1 of the magnified display area) away from a proximity corresponding position P2 by the predetermined distance s2 is magnified and displayed.

(Operation Outline 1: The Magnified Display of the Display Area of the Predetermined Range AR1 Around the Position Away from the Proximity Corresponding Position by the Predetermined Distance s2)

The browser screen data generation unit 45 generates screen data to be displayed on the screen DP of the screen display unit 90 at the time when the browser application 40 is used and then outputs the screen data to the screen display control unit 80. The screen display control unit 80 displays the display content of the browser application 40 on the screen DP of the screen display unit 90 using the screen data output from the browser screen data generation unit 45.

In the case that the display content of the browser application 40 shown in FIG. 2(A) is displayed on the screen DP of the screen display unit 90, it is assumed that the finger FG of the user performed, for example, a hover operation from the proximity corresponding position P2 to a position in the space inside the proximity detection area, as shown in FIG. 2(B). Although a hover operation is explained as an example of the input operation of the finger FG, a hover-slide operation may also be performed. On the basis of the information of the proximity coordinates (x, y, z) output from the proximity coordinate evaluation unit 10, the operation judgment unit 30 judges that the input operation of the finger FG is a hover operation and outputs the information of the proximity corresponding position P2 to the magnification position determination unit 50.

On the basis of the information of the proximity corresponding position P2 output from the operation judgment unit 30, the magnification position determination unit 50 determines the position away from the proximity corresponding position P2 by the predetermined distance s2 as the center position P1 of the magnified display area. In FIG. 2(B), the center position P1 of the magnified display area is, for example, the position away from the proximity corresponding position P2 by the predetermined distance s2 in the positive direction of the y-axis; however, the position is not limited to the position away therefrom by the predetermined distance s2 in the positive direction of the y-axis.

The magnification position determination unit 50 temporarily stores the information of the size and the center position P1 of the magnified display area and outputs the information to the magnified image generation unit 70. On the basis of the information output from the magnification position determination unit 50, the magnified image generation unit 70 generates the image data of the magnified display area and outputs the image data to the screen display control unit 80. The screen display control unit 80 magnifies and displays the predetermined range AR1 around the center position P1 of the magnified display area using the display content shown in FIG. 2(A) and the image data output from the magnified image generation unit 70 (refer to FIG. 2(B)).

Hence, although the finger FG interrupted the display of the magnified predetermined range AR1 in the prior art, the display content of the predetermined range AR1 around the position away from the proximity corresponding position P2 of the finger FG by the predetermined distance s2 is magnified and displayed in the portable terminal 1 according to this embodiment; as a result, the visibility of the display content of the predetermined range AR1 is not degraded and the visibility of the content of the magnified predetermined range AR1 can be improved. Furthermore, in the portable terminal 1, the finger FG does not interrupt the display of the magnified predetermined range AR1 and the visibility of the magnified display content can be improved by making the value of the predetermined distance s2 larger than the predetermined value.

(Operation Outline 2: The Temporal Fixing of the Magnified Display of the Predetermined Range AR1 on the Basis of a Touch Operation Inside the Magnified Display Area)

FIG. 3(A) is a view showing a state in which the predetermined range AR1 around the proximity corresponding position P2 is magnified and displayed. FIG. 3(B) is a view showing a state in which the finger FG performed a touch operation at the center position P1 of the magnified predetermined range AR1. FIG. 3(C) is a view showing a state in which after the touch operation shown in FIG. 23(B), the finger FG was moved by a touch-slide operation to a position away from the position of the touch coordinates by a predetermined distance s1.

Figure 3:
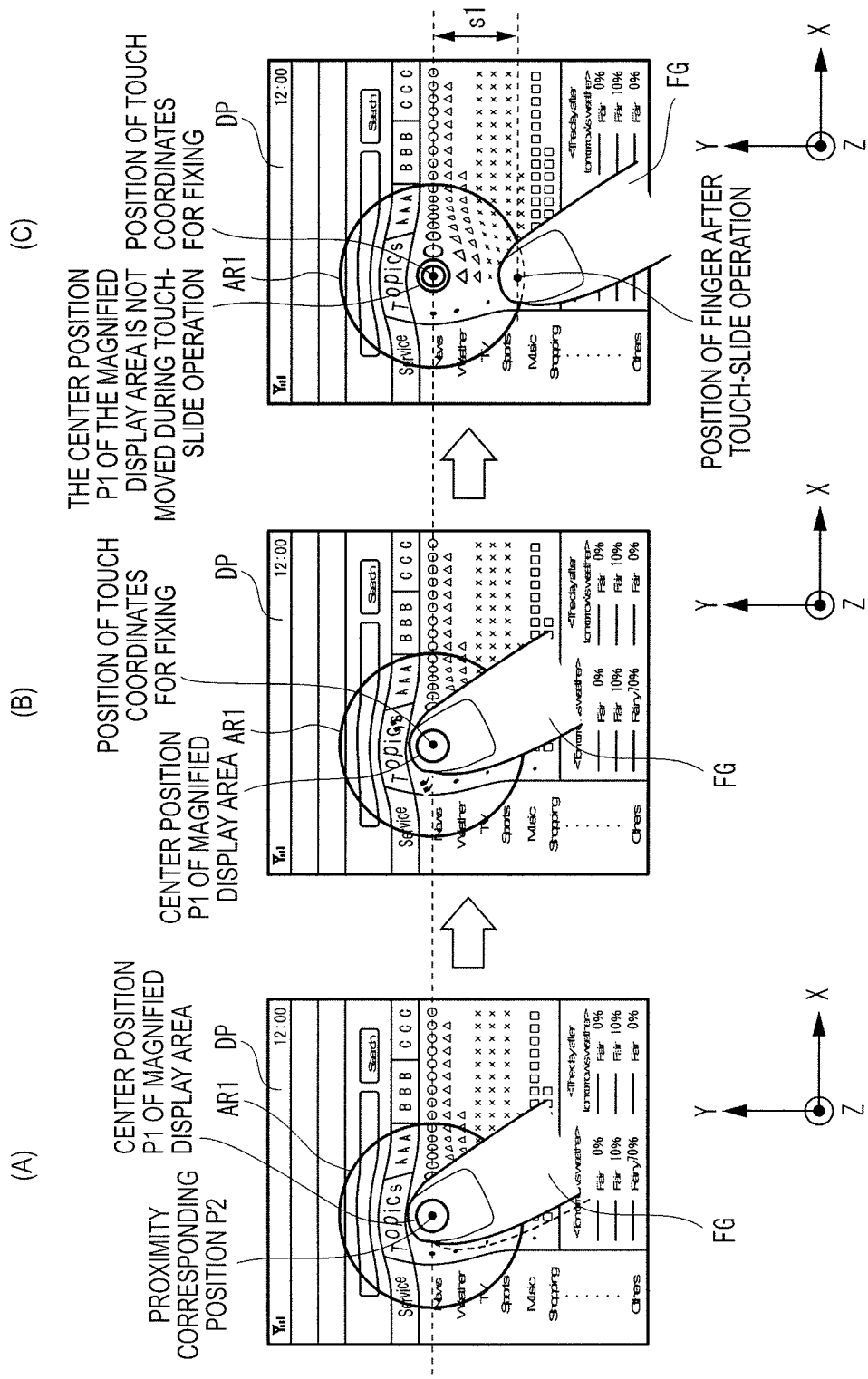
FIG. 3(A) is a view showing a state in which the predetermined range AR1 around the proximity corresponding position P2 is magnified and displayed.
FIG. 3(B) is a view showing a state in which a finger FG performed a touch operation at the center position of the magnified predetermined range AR1.
FIG. 3(C) is a view showing a state in which after the touch operation shown in FIG. 3(B), the finger FG was moved by performing a touch-slide operation to a position away from the position of the touch coordinates by a predetermined distance s1.

In FIG. 2(B), the magnification position determination unit 50 determined the position away from the proximity corresponding position P2 by the predetermined distance s2 as the center position P1 of the magnified display area. In FIG. 3(A), the magnification position determination unit 50 determines the proximity corresponding position P2 output from the operation judgment unit 30 as the center position P1 of the magnified display area (refer to FIG. 3(A)). In the view in FIG. 3 showing the determination of the magnified display area, the combined operation of the operation outline 1 and the operation outline 2 may be carried out as a variation of the operation outline of the portable terminal 1 according to this embodiment.

In other words, in the case that the display content of the browser application 40 shown in FIG. 2(A) is displayed on the screen DP of the screen display unit 90, it is assumed that the finger FG of the user performed, for example, a hover operation from the proximity corresponding position P2 to a position in the space inside the proximity detection area in the positive direction of the z-axis (refer to FIG. 3(A)). On the basis of the information of the proximity coordinates (x, y, z) output from the proximity coordinate evaluation unit 10, the operation judgment unit 30 judges that the input operation of the finger FG is a hover operation and outputs the information of the proximity corresponding position P2 to the magnification position determination unit 50.

The magnification position determination unit 50 determines the proximity corresponding position P2 output from the operation judgment unit 30 as the center position P1 of the magnified display area. The magnification position determination unit 50 temporarily stores the information of the size and the center position P1 of the magnified display area and outputs the information to the magnified image generation unit 70. On the basis of the information output from the magnification position determination unit 50, the magnified image generation unit 70 generates the image data of the magnified display area and outputs the image data to the screen display control unit 80. The screen display control unit 80 magnifies and displays the predetermined range AR1 around the center position P1 of the magnified display area using the display content shown in FIG. 2(A) and the image data output from the magnified image generation unit 70 (refer to FIG. 3(A)).

Furthermore, it is assumed that the finger FG of the user performed a touch operation, for example, at the position (for example, the center position P1) of the predetermined range AR1 after the predetermined range AR1 around the center position P1 was magnified and displayed (refer to FIG. 3(B)). On the basis of the information of the touch coordinates (x, y) output from the touch coordinate evaluation unit 20, the operation judgment unit 30 judges that the input operation of the finger FG is a touch operation and outputs the information of the touch coordinates (x, y) to the magnification position determination unit 50.

In the case that the position (for example, the center position P1) of the magnified predetermined range AR1 is touched by the touch operation of the finger FG, the magnification position determination unit 50 judges that the current display content of the browser application 40, that is, the magnified display of the predetermined range AR1 shown in FIG. 3(B), is continued fixedly, regardless of the presence or absence of the touch-slide operation of the finger FG. As a result, in the portable terminal 1, the display position of the magnified predetermined range AR1 on the screen DP can be temporarily fixed, regardless of the presence or absence of the touch-slide operation of the finger FG.

Furthermore, after the position (for example, the center position P1) of the magnified predetermined range AR1 was touched by the touch operation of the finger FG, the magnification position determination unit 50 temporarily stores, in the magnified display state data management unit 60, the information of the touch coordinates (x, y) output from the operation judgment unit 30 at the time of the switching from the hover operation to the touch operation of the finger FG in the case that the continuous movement of the magnified display area at the time of the switching from the touch-slide operation to the hover operation is performed again. Moreover, the magnified image generation unit 70 outputs, to the screen display control unit 80, a magnified image in which the display position of the magnified display area has been fixed, regardless of the information of the touch coordinates (x, y) output from the operation judgment unit 30 during the touch-slide operation of the finger FG.

After the magnification position determination unit 50 has judged that the magnified display of the predetermined range AR1 is temporarily continued, the screen display control unit 80 continues the magnified display of the predetermined range AR1 around the position of the touch coordinates (x, y) touched by the touch operation of the finger FG, regardless of the presence or absence of the touch-slide operation of the finger FG, until the fixing of the magnified display of the predetermined range AR1 is released (refer to FIG. 3(C)). The timing at which the fixing of the magnified display of the predetermined range AR1 is released is the time when the magnification position determination unit 50 has received, from the operation judgment unit 30, the information stating that the finger FG performed a release operation from the screen DP and performed a hover operation again.

Hence, in the portable terminal 1, even if the finger FG is moved, for example, from the inside of the predetermined range AR1 to the outside of the predetermined range AR1, the visibility of the content of the magnified predetermined range AR1 is not degraded, and the visibility of the content of the magnified predetermined range AR1 can be improved.

(Operation Outline 3: The Movement of the Magnified Display Area to a New Proximity Corresponding Position by a Release Operation and a Hover Operation of the Finger FG)

FIG. 4(A) is a view showing a state in which the finger FG, having performed a touch-slide operation after the magnified display of the predetermined range AR1 was fixed, is just before performing a hover operation again. FIG. 4(B) is a view showing a state in which the magnified predetermined range AR2 is being moved toward the proximity corresponding position (position P5) of the finger FG having performed the hover operation again as shown in FIG. 4(A). FIG. 4(C) is a view showing a state in which the movement of the magnified predetermined range AR3 shown in FIG. 4(B) was ended.

It is assumed that in the case of the continuation of the fixing of the magnified display of the predetermined range AR1 shown in FIG. 3(C), the finger FG was moved, for example, to the position P3 shown in FIG. 4(A) by a touch-slide operation. However, as described above, in the portable terminal 1, during the continuation of the fixing of the magnified display of the predetermined range AR1 shown in FIG. 3(C), the display position of the magnified display area is not changed, but fixed, regardless of the presence or absence of the touch-slide operation of the finger FG. The position P3 is a position at the time when the finger FG finishes the touch-slide operation and performs a release operation and then performs a hover operation again.

It is herein assumed that the finger FG having been moved to the position P3 by the touch-slide operation performed a hover operation again. The operation judgment unit 30 outputs, to the magnification position determination unit 50, information stating that the input operation of the finger FG is a hover operation and the information of the proximity corresponding position of the finger FG that is performing the hover operation. On the basis of the information output from the operation judgment unit 30, the magnification position determination unit 50 judges that the fixing of the magnified display of the predetermined range AR1 is released, calculates a magnification position required for performing display so that the magnified display area is moved toward the proximity corresponding position of the finger FG that is performing the hover operation, and outputs the magnification position to the magnified image generation unit 70. By using the calculated magnification position and the screen data obtained from the browser screen data generation unit 45, the magnified image generation unit 70 generates the magnified image of the magnified display area and outputs the magnified image to the screen display control unit 80.

The method for moving the magnified display area is at least one of the following methods: a method in which the magnified display area is moved instantaneously, a method in which the magnified display area is moved at an approximately constant speed (including uniform speed), and a method in which the magnified display area is moved under acceleration. The portable terminal 1 can quickly follow the input operation of the user by instantaneously moving the magnified display area. In addition, the portable terminal 1 can display the continuous movement of the magnified display area by moving the magnified display area at the approximately constant speed (including uniform speed) or by moving the magnified display area under acceleration.

At every predetermined time $\Delta t$ during the period in which the magnified display area is moved to the position of the movement destination of the magnified display area output from the operation judgment unit 30, that is, to the proximity corresponding position of the finger FG that is performing the hover operation, the magnification position determination unit 50 calculates and determines the center position of the magnified display area being moved, by using the magnified display state data stored in the magnified display state data management unit 60.

In the case that the method in which the magnified display area is moved under acceleration is used as the method for moving the magnified display area, an example (step (T1) to step (T5)) of a method, according to which the magnification position determination unit 50 calculates the center position of the magnified display area at every predetermined time $\Delta t$, will herein be described. However, the example in which the magnification position determination unit 50 calculates the center position of the magnified display area at the time of the movement of the magnified display area is not limited to (step T1) to (step T5).

(Step T1) On the basis of the information of the position of the movement destination of the magnified display area output from the operation judgment unit 30, that is, the information of the proximity corresponding position (the same position as the position P3) of the finger FG that is performing a hover operation, and the information of the center position P1 of the magnified display area before the movement, which is temporarily stored in the magnified display state data management unit 60, the magnification position determination unit 50 stores, in the magnified display state data management unit 60, the position (for example, the center position P1), the movement speed v and the movement acceleration a of the current (initial) magnified display area immediately before the movement of the magnified display area as the initial values of the magnified display state data. Both the movement speed v and the movement acceleration a in the initial state are zero.

(Step T2) The magnification position determination unit 50 calculates the movement acceleration a ($a=k \cdot d$) that is proportional to the distance d between the proximity corresponding position (the same position as the position P3) of the finger FG performing the hover operation and the center position P1 of the magnified display area before the movement. k is a proportionality coefficient (a predetermined value). At each calculation of the movement acceleration a, the magnification position determination unit 50 updates the value of the latest movement acceleration a stored in the magnified display state data management unit 60 to the value of the movement acceleration a calculated at (step T2).

(Step T3) On the basis of the movement acceleration a calculated at (step T2) and a micro time $\Delta t$, the magnification position determination unit 50 calculates the change amount $\Delta v$ of the movement speed of the magnified display area after the micro time $\Delta t$ ($\Delta v = a \cdot \Delta t$).

(Step T4) The magnification position determination unit 50 adds the change amount $\Delta v$ of the movement acceleration calculated at (step T3) to the movement speed v of the latest magnified display area stored in the magnified display state data management unit 60 ($v' = v + \Delta v$). At each calculation of the movement speed $\Delta v$ described at (step T2), the magnification position determination unit 50 updates the movement speed v of the latest magnified display area stored in the magnified display state data management unit 60 to the value of the movement speed v' calculated at (step T4).

(Step T5) The magnification position determination unit 50 multiplies the movement speed v' calculated at (step T4) by the micro time $\Delta t$ to calculate a movement distance $\Delta p$ (not shown), and then adds the position p (not shown) of the latest magnified display stored in the magnified display state data management unit 60 to $\Delta p$ to calculate the position p' (not shown) of the current magnified display. The magnification position determination unit 50 judges that the position p' of the current magnified display calculated at (step T5) as the center position of the magnified display area being moved and updates the position p of the latest magnified display area stored in the magnified display state data management unit 60 to the value of the position p' of the current magnified display and then outputs the value to the magnified image generation unit 70.

On the basis of the information of the position output from the magnification position determination unit 50, the magnified image generation unit 70 generates the image data of the magnified display area around the position output from the magnification position determination unit 50 and outputs the image data to the screen display control unit 80. The screen display control unit 80 synthesizes the screen data of the browser application 40 output from the browser screen data generation unit 45 and the image data of the magnified display area output from the magnified image generation unit 70 and displays the synthesized screen data on the screen display unit 90 (refer to FIG. 4(B) or 4(C)).

Hence, in the portable terminal 1, when a release operation and a hover operation are performed again after the finger FG was moved by the touch-slide operation, the magnified display area can be displayed so as to be moved continuously from the center position of the magnified display area at the time when the magnified display was fixed to the proximity corresponding position at the time when the hover operation was detected.

The position P4 shown in FIG. 4(B) indicates the center position of the magnified display area at a certain moment in the middle of the movement of the magnified display area.

The position P5 shown in FIG. 4(C) indicates the center position of the magnified display area at the time when the movement of the magnified display area was ended and is the same position as the position P3 shown in FIG. 4(A).

(Operation Outline 4: The Circular or Quadrangular Shape of the Magnified Display Area)

FIG. 5(A) is a view showing an example of the magnified display area having a circular shape. FIG. 5(B) is a view showing an example of the magnified display area having a quadrangular shape. In this embodiment, the magnified predetermined range has either one of a nearly circular shape including a true circle, a nearly elliptical shape including an elliptical shape and a nearly quadrangular shape including a square or rectangular shape.

In the case that the display content of the browser application 40 shown in FIG. 2(A) has been displayed on the screen DP of the screen display unit 90, it is assumed that the finger FG of the user has performed, for example, a hover operation from the proximity corresponding position P2 to a position in the space within the proximity detection area in the positive direction of the z-axis (refer to FIG. 5(A)). On the basis of the information of the proximity coordinates (x, y, z) output from the proximity coordinate evaluation unit 10, the operation judgment unit 30 judges that the input operation of the finger FG is a hover operation and outputs the information of the proximity corresponding position P2 to the magnification position determination unit 50.

The magnification position determination unit 50 determines the proximity corresponding position P2 output from the operation judgment unit 30 as the center position P1 of the magnified display area. The magnification position determination unit 50 temporarily stores the information of the size and the center position P1 of the magnified display area in the magnified display state data management unit 60 and further outputs the information to the magnified image generation unit 70. On the basis of the information output from the magnification position determination unit 50, the magnified image generation unit 70 generates the image data of the magnified display area and outputs the image data to the screen display control unit 80.

As shown in FIG. 5(A), the image data of the magnified display area generated by the magnified image generation unit 70 herein includes the image data of a first display area AR1st having a circular shape and a magnification display ratio larger than the predetermined value (for example, 2) and the image data (refer to the hatching area shown in FIG. 5(A)) of a second display area AR2nd having a circular shape and a magnification display ratio smaller than the predetermined value (for example, 2). In other words, in the magnified display area, since the magnification display ratio of the first display area AR1st is larger than that of the second display area AR2nd, the visibility of the display content of the first display area AR1st is higher than that of the display content of the second display area AR2nd.

By using the display content shown in FIG. 2(A) and the image data output from the magnified image generation unit 70, the screen display control unit 80 magnifies and displays a predetermined range AR1 around the center position P1 of the magnified display area (refer to FIG. 5(A)).

With this configuration of the portable terminal 1, the magnified display area is separated into a plurality of display areas (for example, the first display area AR1st and the second display area AR2nd) and the display areas are displayed concentrically, and the display content of the first display area AR1st on the inner side of the predetermined range to be magnified is thus displayed so as to be more magnified than that of the second display area AR2nd on the outer side thereof, whereby the visibility of the display content of the first display area AR1st can be improved further.

In addition, as shown in FIG. 5(B), the image data of the magnified display area generated by the magnified image generation unit 70 includes the image data of a first display area AR3rd having a quadrangular shape and a magnification display ratio larger than the predetermined value (for example, 2) and the image data (refer to the hatching area shown in FIG. 5(B) of a second display area AR4th having a quadrangular shape and a magnification display ratio smaller than the predetermined value (for example, 2). In other words, in the magnified display area, since the magnification display ratio of the first display area AR3rd is larger than that of the second display area AR4th, the visibility of the display content of the first display area AR3rd is higher than that of the display content of the second display area AR4th.

By using the display content shown in FIG. 2(A) and the image data output from the magnified image generation unit 70, the screen display control unit 80 magnifies and displays a predetermined range AR4 around the center position P1 of the magnified display area (refer to FIG. 5(B)).

With this configuration of the portable terminal 1, the magnified display area is separated into the first display area AR3rd and the second display area AR4th having a quadrangular shape instead of a circular shape and the display areas are displayed concentrically, whereby the visibility of the display content "ΔΔ" displayed in the range AR6 of the first display area AR3rd shown in FIG. 5(B) can be improved more than the visibility of the display content "ΔΔ" displayed in a range AR5 being present so as to straddle over the first display area AR1st and the second display area AR2nd shown in FIG. 5(A).

(Operation of the Portable Terminal 1 According to this Embodiment)

Figure 4:
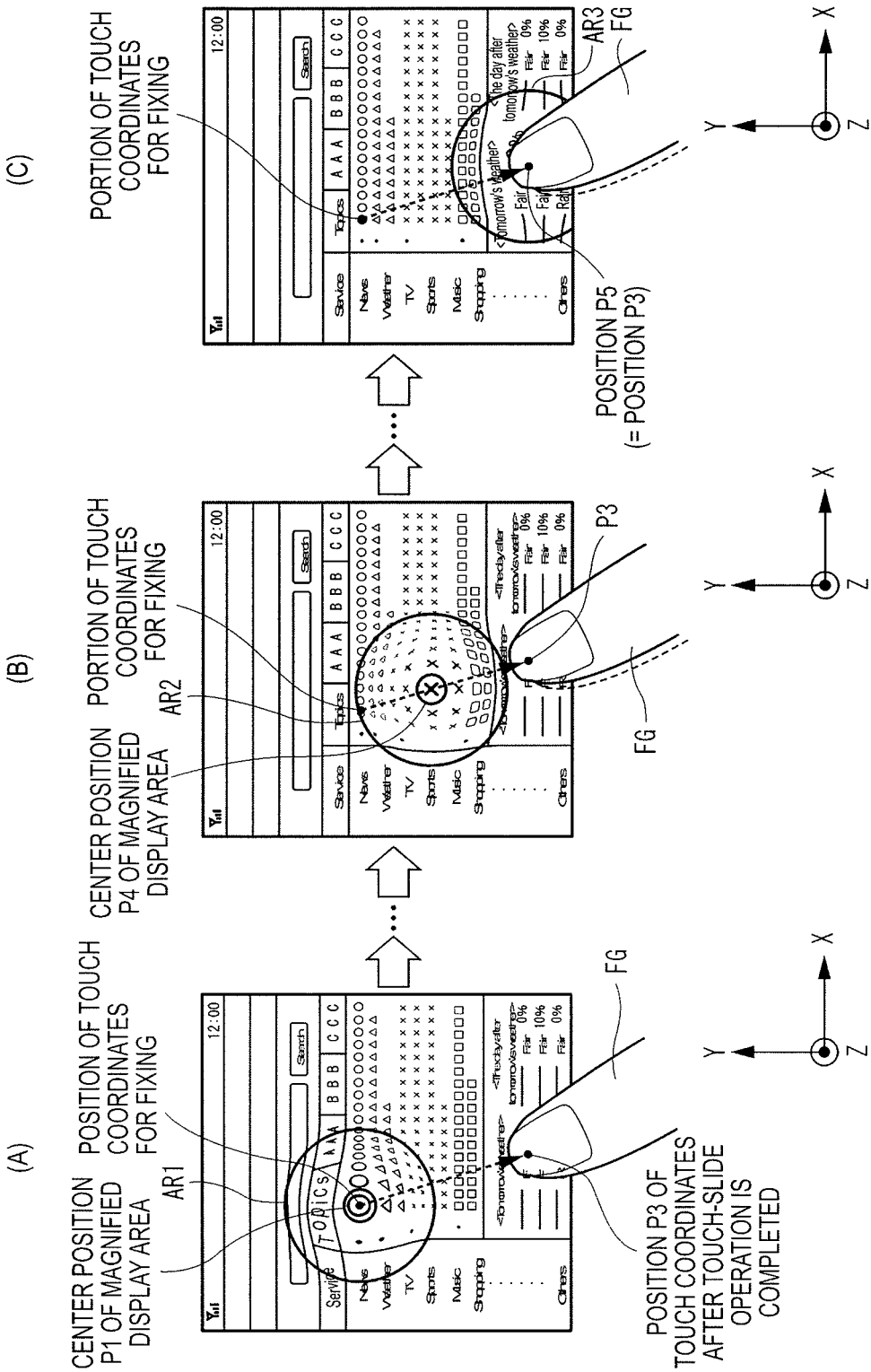
FIG. 4(A) is a view showing a state in which the finger FG, having performed a touch-slide operation after the magnified display of the predetermined range AR1 was fixed, is just before performing a proximity (hover) operation again.
FIG. 4(B) is a view showing a state in which a magnified predetermined range AR2 is being moved toward the proximity corresponding position of the finger FG having performed the proximity (hover) operation again as shown in FIG. 4(A)
FIG. 4(C) is a view showing a state in which the movement of the magnified predetermined range AR3 shown in FIG. 4(B) was ended.
Figure 6:
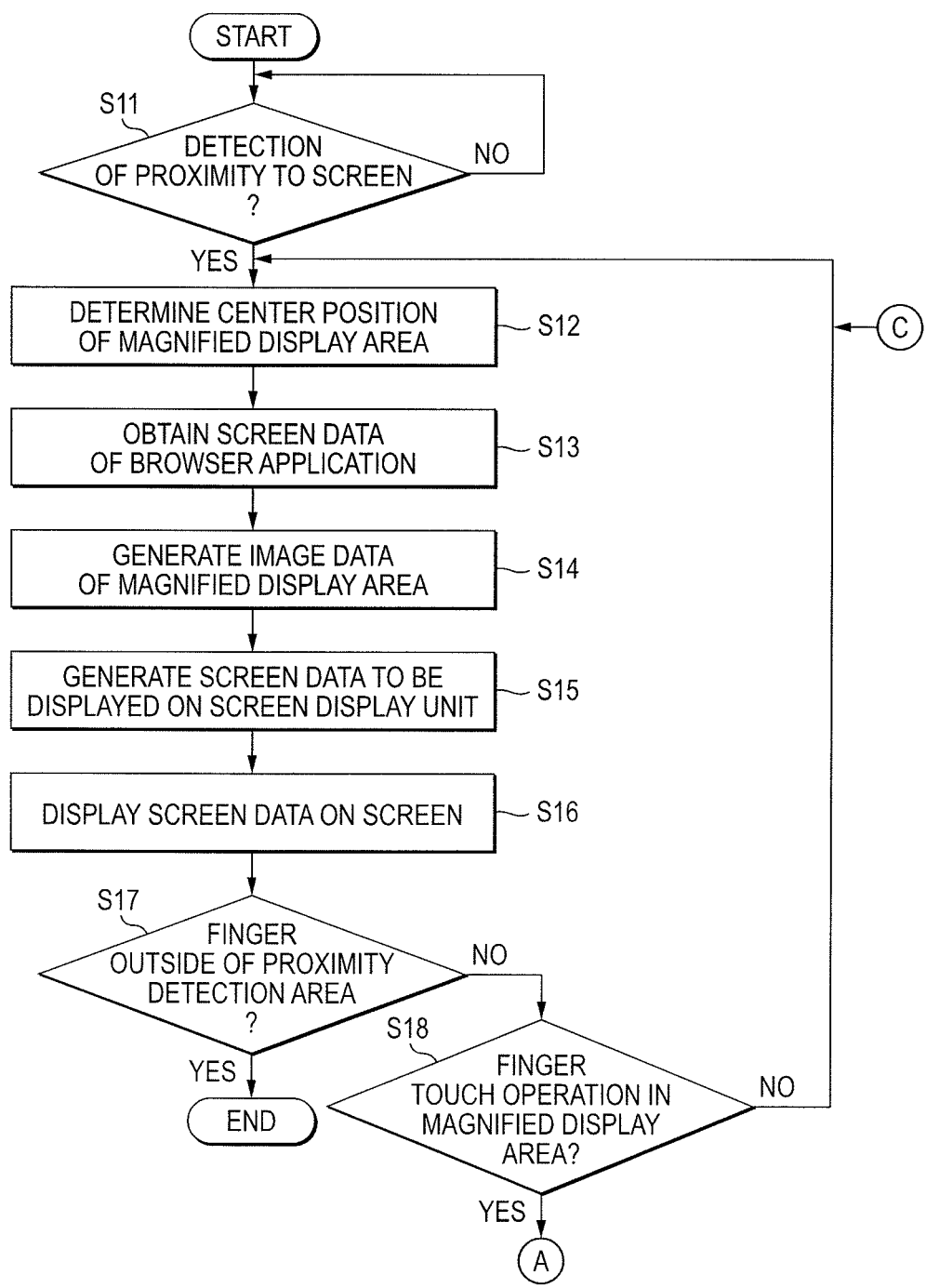
FIG. 6 is a flow chart illustrating part of the operation steps of the portable terminal 1 according to this embodiment.
Figure 7:
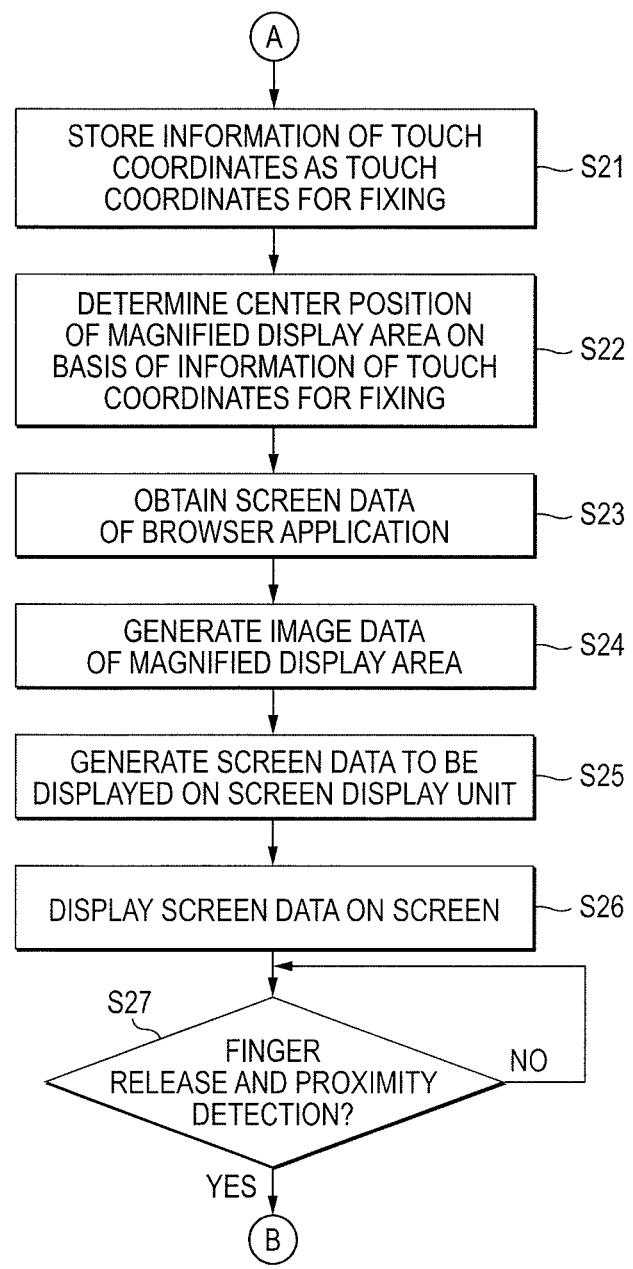
FIG. 7 is a flow chart illustrating part of the operation steps of the portable terminal 1 according to this embodiment.
Figure 8:
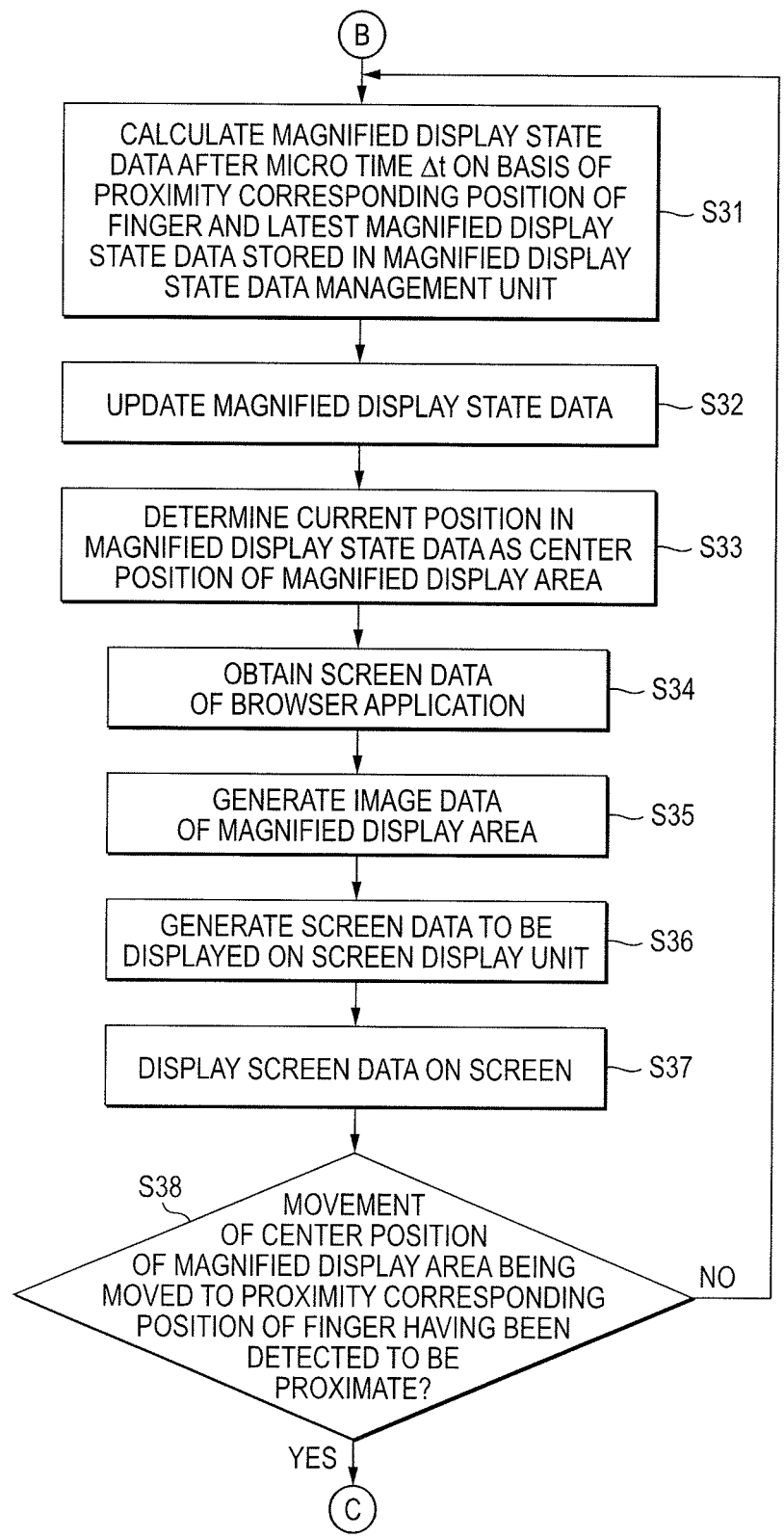
FIG. 8 is a flow chart illustrating part of the operation steps of the portable terminal 1 according to this embodiment.

Next, the operation of the portable terminal 1 according to this embodiment will be explained referring to FIGS. 6 to 8. FIG. 6 is a flow chart illustrating part of the operation steps of the portable terminal 1 according to this embodiment. In the explanation referring to FIG. 6, the content of FIG. 2 or 3 is referred to as necessary. FIG. 7 is a flow chart illustrating part of the operation steps of the portable terminal 1 according to this embodiment. In the explanation referring to FIG. 7, the content of FIG. 3 is referred to as necessary. FIG. 8 is a flow chart illustrating part of the operation steps of the portable terminal 1 according to this embodiment. In the explanation referring to FIG. 8, the content of FIG. 4 is referred to as necessary. As a presumption of the explanation referring to FIG. 6, the screen display control unit 80 has displayed the screen data of the browser application 40 output from the browser screen data generation unit 45 on the screen display unit 90 (refer to FIG. 2(A)).

In FIG. 6, the operation judgment unit 30 of the portable terminal 1 judges whether the finger FG has been proximate to a certain position on the screen DP (at S11). Only in the case that the operation judgment unit 30 has judged that the input operation of the finger FG at the certain position on the screen DP is a hover operation on the basis of the information of the proximity coordinates (x, y, z) output from the proximity coordinate evaluation unit 10 (YES at S11), the operation judgment unit 30 outputs the information (for example, coordinate information) of the proximity corresponding position P2 to the magnification position determination unit 50.

On the basis of the information of the proximity corresponding position P2 output from the operation judgment unit 30, the magnification position determination unit 50 determines the proximity corresponding position P2 as the center position P1 of the magnified display area (at S12, refer to FIG. 3(A)). Furthermore, on the basis of the information of the proximity corresponding position P2 output from the operation judgment unit 30, the magnification position determination unit 50 may determine a position away from the proximity corresponding position P2 by the predetermined distance s2 as the center position P1 of the magnified display area (at S12, refer to FIG. 2(B)).

The magnification position determination unit 50 temporarily stores the information of the size and the center position P1 of the magnified display area in the magnified display state data management unit 60 and further outputs the information to the magnified image generation unit 70. The magnified image generation unit 70 obtains the screen data of the browser application 40 generated by the browser screen data generation unit 45 (at S13) and further generates the image data of the magnified display area on the basis of the information output from the magnification position determination unit 50 and outputs the image data to the screen display control unit 80 (at S14). The screen display control unit 80 generates screen data to be displayed on the screen DP using the display content shown in FIG. 2(A) and the image data output from the magnified image generation unit 70 (at S15) and then magnifies and displays the predetermined range AR1 around the center position P1 of the magnifies and displays (at S16, refer to FIG. 2(B)).

After step S16, in the portable terminal 1, in the case that the finger FG, the proximity of which was detected at step S11, was moved to the outside of a predetermined proximity detection area in the positive direction of the z-axis and became unable to be detected (YES at S17), the operation of the portable terminal 1 is ended. On the other hand, in the case that the finger FG, the proximity of which was detected at step S11, has not been moved to the outside of the predetermined proximity detection area in the positive direction of the z-axis (NO at S17), the operation judgment unit 30 of the portable terminal 1 judges whether the finger FG performed a touch operation at a certain position (for example, the center position P1) inside the magnified display area displayed at step S16 (at S18). In the case that the operation judgment unit 30 does not judge that the finger FG performed a touch operation at the certain position (for example, the center position P1) in the magnified display area displayed at step S16 (NO at S18), the operation of the portable terminal 1 returns to step S12.

On the other hand, in the case that the operation judgment unit 30 has judged that the finger FG performed a touch operation at the certain position (for example, the center position P1) in the magnified display area displayed at step S16 (YES at S18), the operation of the portable terminal 1 advances to step S21 shown in FIG. 7. More specifically, on the basis of the information of the touch coordinates (x, y) output from the touch coordinate evaluation unit 20, the operation judgment unit 30 judges that the input operation of the finger FG is a touch operation and outputs the information of the touch coordinates (x, y) to the magnification position determination unit 50.

In the case that the position (for example, the center position P1) of the magnified predetermined range AR1 was touched by the touch operation of the finger FG, the magnification position determination unit 50 judges that the magnified display of the display content of the current browser application 40, that is, the magnified display of the predetermined range AR1 shown in FIG. 3(B), is continued fixedly, regardless of the presence or absence of the touch-slide operation of the finger FG, and then stores, in the magnified display state data management unit 60, the information of the touch coordinates (x, y) at the time when the finger FG performed the touch operation at step S18 as the touch coordinates for the fixed continuation of the magnified display of the predetermined range AR1 (at S21).

Furthermore, on the basis of the information of the touch coordinates (x, y) temporarily stored at step S21, the magnification position determination unit 50 determines the position of the touch coordinates (x, y) as the center position P1 of the magnified display area (at S22, refer to FIG. 3(B)). Since the operation from step S23 to step S26 is the same as the operation from step S13 to step S16 shown in FIG. 6, the explanation of the operation is omitted. Besides, although FIG. 7 shows that the operation from step S23 to step S26 is executed in the portable terminal 1, the operation from step S23 to step S26 to be performed as the operation of the portable terminal 1 may be omitted. Hence, in the portable terminal 1, the display position of the magnified predetermined range AR1 on the screen DP can be temporarily fixed on the basis of the touch operation of the finger FG at the certain position in the magnified display area at step S18, regardless of the presence or absence of the touch-slide operation of the finger FG (refer to FIG. 3(C)).

After step S26, the operation judgment unit 30 of the portable terminal 1 judges whether the finger FG performed a release operation and then performed a hover operation again (at S27, refer to FIG. 4(A)). In the case that the operation judgment unit 30 does not judge that the finger FG performed the release operation and then performed the hover operation again (NO at S27), the operation of the portable terminal 1 returns to step S27; however, the operation of the portable terminal 1 may return to step S23, for example.

In the case that the operation judgment unit 30 has judged that the finger FG performed the release operation then performed the hover operation again (YES at S27), the operation of the portable terminal 1 advances to step S31. More specifically, the operation judgment unit 30 outputs, to the magnification position determination unit 50, information stating that the input operation of the finger FG is the hover operation and the information of the proximity corresponding position of the finger FG that is performing the hover operation. On the basis of the information output from the operation judgment unit 30, the magnification position determination unit 50 judges that the fixing of the magnified display of the predetermined range AR1 is released, temporarily stores the information of the proximity corresponding position of the finger FG performing the hover operation in the magnified display state data management unit 60, calculates a magnification position required for performing display so that the magnified display area is moved toward the proximity corresponding position, and outputs the magnification position to the magnified image generation unit 70. By using the calculated magnification position and the screen data obtained from the browser screen data generation unit 45, the magnified image generation unit 70 generates the magnified image of the magnified display area and outputs the magnified image to the screen display control unit 80.

On the basis of the proximity corresponding position of the finger FG, the proximity of which was detected at S27 and the latest magnified display state data stored in the magnified display state data management unit 60, the magnification position determination unit 50 calculates magnified display state data after the micro time Δt at every micro time Δt and updates the latest magnified display state data (at S31 and S32). The magnified display state data includes one or more of the latest position, speed and acceleration of the magnified display area being moved. Since the details of the operation at step S31 and step S32 have been explained in the above-mentioned (step T1) to (step T5), the explanation of the operation is herein omitted.

The magnification position determination unit 50 determines the position of the latest magnified display area updated at step S32 as the center position of the magnified display area being moved (at S33, refer to FIG. 4(B)). Since the operation from step S34 to step S37 is the same as the operation from step S13 to step S16 shown in FIG. 6, the explanation of the operation is omitted.

After step S37, the magnification position determination unit 50 of the portable terminal 1 judges whether the center position of the magnified display area being moved has been moved to the proximity corresponding position of the finger FG, the proximity of which was detected at S27 (at S38, refer to FIG. 4(C)). In the case that the magnification position determination unit 50 does not judge that the center position of the magnified display area being moved has been moved to the proximity corresponding position of the finger FG, the proximity of which was detected at S27 (NO at S38), the operation of the portable terminal 1 returns to step S31.

On the other hand, in the case that the magnification position determination unit 50 has judged that the center position of the magnified display area being moved has been moved to the proximity corresponding position of the finger FG, the proximity of which was detected at S27 (YES at S38), the operation of the portable terminal 1 returns to step S12 shown in FIG. 6.

As a result, in the portable terminal 1 according to this embodiment, the predetermined range around the proximity corresponding position on the screen DP corresponding to the position of the finger FG, the proximity of which was detected, or the position away from the proximity corresponding position by the predetermined distance s2 is magnified and displayed (refer to FIG. 2(B) or FIG. 3(A)). Furthermore, in the portable terminal 1, on the basis of the contact of the finger FG to the magnified display area, the magnified display of the predetermined range having already been magnified and displayed is continued fixedly, regardless of the presence or absence of the movement operation (touch-slide operation) of the finger FG on the screen DP (refer to FIGS. 3(A) to 3(C)).

Moreover, in the portable terminal 1, when the finger FG performed a release operation and then performed a hover operation again during the continuation of the magnified display of the predetermined range, the magnified display area is displayed so as to be moved continuously from the center position of the magnified display area to the proximity corresponding position corresponding to the position of the finger FG performing the hover operation, the proximity of which was newly detected (refer to FIGS. 4(A) to 4(C)).

As a result, in the portable terminal 1, the predetermined range around the proximity corresponding position on the screen corresponding to the position of the finger FG, the proximity of which was detected, or the position away from the proximity corresponding position by the predetermined distance s2 is magnified and displayed, and on the basis of the contact of the indicator to the screen, the magnified display of the predetermined range is continued fixedly, regardless of the presence or absence of the movement operation of the indicator on the screen, whereby the visibility of the magnified content can be improved.

Although various embodiments have been described above referring to the drawings, it is needless to say that the present invention is not limited to the various embodiments. It is obvious that those skilled in the art can arrive at changes or modifications of the various embodiments and combinations of the various embodiments within the technological scope described in the appended claims, and it is understood that the modifications also belong to the technological scope of the present invention as a matter of course.

Although the shape of the predetermined range to be magnified and displayed is circular or quadrangular in the above-mentioned embodiments, the shape may be elliptical, for example.

This application is based upon Japanese Patent Application (No. 2012-177368) filed on Aug. 9, 2012, the contents of which are incorporated herein by reference.

INDUSTRIAL APPLICABILITY

Since the predetermined range around the position (proximity corresponding position) on the screen corresponding to the position of the indicator (for example, a finger), the proximity of which was detected, is magnified and displayed and the magnified display of the predetermined range is continued fixedly on the basis of the contact of the indicator to the screen, regardless of the presence or absence of the movement operation of the indicator on the screen, the present invention, more simplified in configuration than the prior art, is useful as a display control device, a display control method and a program for improving the visibility of magnified contents.

DESCRIPTION OF REFERENCE NUMERALS AND SIGNS

1 portable terminal
5 proximity detection unit
10 proximity coordinate evaluation unit
15 touch detection unit
20 touch coordinate evaluation unit
30 operation judgment unit
40 browser application
50 magnification position determination unit
60 magnified display state data management unit
70 magnified image generation unit
80 screen display control unit
90 screen display unit

The invention claimed is:

1. A display control device comprising:
a contact detector that detects contact of an indicator with a screen;
a proximity detector that detects a proximity of the indicator to the screen, when the contact is not detected and when a distance between the indicator and the screen is smaller than a predetermined value; and a display controller that magnifies an image of a predetermined region on the screen when at least one of the proximity and the contact is detected, wherein the display controller moves a position of the predetermined region according to a change in a position of the indicator while the proximity is detected, and the display controller fixes the position of the predetermined region, regardless of a change in the position of the indicator while the contact detected by the contact detector is continuously maintained,
wherein the display controller releases the fixing of the position of the predetermined region, when the proximity of the indicator to the screen is detected while the position of the predetermined region is fixed, wherein the predetermined region has one of a circular shape, an elliptical shape and a quadrangular shape.

2. The display control device according to claim 1, wherein, in response to the releasing the fixing of the position of the predetermined region, the display controller moves the position of the predetermined region instantaneously to a position on the screen corresponding to the position of the indicator.

3. The display control device according to claim 1, wherein, in response to the releasing the fixing of the position of the position of the predetermined region, the display controller moves the position of the predetermined region at a uniform speed or at a nearly uniform speed from the fixed position to a position on the screen corresponding to the position of the indicator.

4. The display control device according to claim 1, wherein, in response to the release of the releasing the fixing of the position of the predetermined region, the display controller moves the position of the predetermined region with acceleration from the fixed position to a position on the screen corresponding to the position of the indicator.

5. The display control device according to claim 1, wherein the position on the screen corresponding to the position of the indicator is a coordinate projecting the position of the indicator on the screen.

6. The display control device according to claim 1, wherein the position on the screen corresponding to the position of the indicator is a position spaced from a coordinate projecting the position of the indicator on the screen by a predetermined distance.

7. The display control device according to claim 1, wherein the predetermined region includes a first display area having a magnification display ratio larger than a predetermined value and a second display area having a magnification display ratio smaller than the predetermined value.

8. A display control method comprising:
detecting contact of an indicator with a screen;
detecting a proximity of the indicator to the screen, when the contact is not detected and when a distance between the indicator and the screen is smaller than a predetermined value; magnifying an image of a predetermined region on the screen when at least one of the proximity and the contact is detected; moving a position of the predetermined region according to a change in a position of the indicator while the proximity is detected; and fixing the position of the predetermined region, regardless of a change in the position of the indicator, while the detected contact is continuously maintained;
releasing the fixing of the position of the predetermined region, when the proximity of the indicator to the screen is detected while the position of the predetermined region is fixed,
wherein the predetermined region has one of a circular shape, an elliptical shape and a quadrangular shape.

9. A non-transitory computer readable recording medium storing a program that causes a computer to perform operations comprising: detecting contact of an indicator with a screen; detecting a proximity of the indicator to the screen, when the contact is not detected and when a distance between the indicator and the screen is smaller than a predetermined value; magnifying an image of a predetermined region on the screen when at least one of the proximity and the contact is detected; moving a position of the predetermined region to according to a change in a position of the indicator while the proximity is detected; and fixing the position of the predetermined region, regardless of a change in the position of the indicator while the detected contact is continuously maintained;
releasing the fixing of the position of the predetermined region, when the proximity of the indicator to the screen is detected while the position of the predetermined region is fixed, wherein the predetermined region has one of a circular shape, an elliptical shape and a quadrangular shape.

* * * * *